Patented Jan. 12, 1943

2,307,894

UNITED STATES PATENT OFFICE 2,307,894

HYDROLYSIS OF META-DIOXANES

Louis A. Mikeska, Westfield, N. J., assignor to Standard Oil Development Company, a corporation of Delaware No Drawing. Application December 14, 1939, Serial No. 309,185

6 Claims. (Cl. 260—635)

The present invention relates to a method for the production of 1,3 alkanediols (glycols) meta-dioxanes (unsymmetrical cyclic diethers). Meta-dioxanes are organic compounds having in their structure a six membered ring, composed of 4 carbon atoms and 2 oxygen atoms, in which the 2 oxygen atoms are attached to a common carbon atom. The meta-dioxanes have the most probable general formula

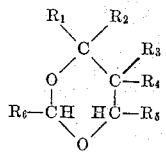

in which $R_1$, $R_2$, $R_3$, $R_4$ and $R_5$ are either aliphatic cyclo aliphatic or aromatic hydrocarbon radicals such as alkyl, aryl, aralkyl and alkaryl i. e. methyl, phenyl, benzyl, toluyl, etc., or substituted aliphatic, cyclo aliphatic and aromatic hydrocarbon radicals, i. e. chloro-methyl, chlorophenyl, chloro-benzyl, chloro-toluyl, etc. Oil refinery gases form a convenient source for dioxanes, which can be readily made from such gases by the method described in the copending application of H. O. Mottern, Serial No. 282,471, filed July 1, 1939. Briefly, the method described by Mottern involves the condensation of the olefins present in refinery gases with an aldehyde in the presence of an acid catalyst, such as sulfuric acid of from 10–85% acid strength, at substantially room temperature.

Instances or examples of 1,3 alkanediols are known to the art. 1,3-propanediol has been found among the by-products of the fermentation of glycerol and glucose. 1,3-butanediol has been prepared by the reduction of acetaldol and by the action of magnesium amalgam on aqueous acetaldehyde. Higher members of the series can be prepared, by similar reactions, from the corresponding aldehydes and aldols, but these synthetic methods cannot be considered to be commercially feasible. It has also been proposed to produce 1,3-butanediol by reacting propylene with formaldehyde-hydrate at approximately 70° C., under pressure, and in the presence of hydrogen chloride, as in U. S. Patent 2,143,370. In this process the yields of 1,3-butanediol are low, due to the formation of beta-chloro-butanol and other by-products.

The 1,3 alkanediols can be obtained by hydrolyzing meta-dioxanes at atmospheric pressure in the presence of dilute acids in the manner well known to the art. However, the yields of glycols by this method are very low. It is therefore apparent that a new method for producing such compounds in higher yields is desirable.

It has now been found that good yields of glycols can be obtained by the hydrolysis of meta-dioxanes if the hydrolysis is carried out in the presence of dilute aqueous solutions of acid-reacting substances, under pressure, at elevated temperatures, and, preferably in the presence of an appropriate olefin. The term "dilute aqueous solutions of acid-reacting substances" is meant to include aqueous solutions of between 0.05% and 5% concentration of acids, such as sulfuric, sulfurous, phosphoric, phosphorous, fluorsulfonic, fluosilicic, dihydroxyfluoboric, and hyrofluoboric acids, or acid-acting metallic salts, such as sodium hydrogen sulfate, sodium dihydrogen phosphate, zinc sulfate, ferric sulfate, aluminum sulfate, and the like. The volume ratio of dilute aqueous solutions of acid-reacting substances to meta-dioxanes is important and should be maintained at least on a parity. A greater volume of dilute acidic solution per volume of meta-dioxane is actually desirable in that the reaction goes more nearly to completion when larger proportions of the dilute acid are used. The quantity of olefin present also effects the extent to which the reactions take place and should exceed that of the meta-dioxane on a mol per mol basis. Any olefin may be used although it is preferable to use the same olefin as was used in making the meta-dioxane, in order that the ensuing glycol, or 1,3 alkanediol, shall be homogeneous in composition. If an olefin, other than that used in the production of the meta-dioxane, is employed, the resulting product will consist of a mixture of alkanediols. The pressure used should at least equal the vapor pressure of the reaction mixture at the operating temperature, although higher pressures are not objectionable. The minimum required pressure varies with the reaction temperature. The reaction rate varies with the concentration of the acid used as well as with the temperature of reaction. The reaction may be carried out at temperature as low as 100° C. or even 50° C. but, for best results, higher temperatures are desirable. The time of reaction is substantially 24 hours for the production of 1,3-butanediol from 4-methyl meta-dioxane at 90° C. to 95° C. The products can be recovered as a residue after removing the lower boiling constituents of the reaction mixture by distillation or they can be removed from the reaction mixture by solvent extraction in which case a water immiscible or substantially water immiscible solvent for the diols, such as phenol, should be employed. The method of this invention may be operated as either a batch or continuous process.

The products are generally liquid, boiling above 200° C., and having specific gravities greater than 1. They have the general formula

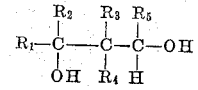

where $R_1$, $R_2$, $R_3$, $R_4$ and $R_5$ are either aliphatic, cyclo-aliphatic, aromatic or substituted aliphatic, cyclo-aliphatic and aromatic hydrocarbon radicals in which the substitution in the hydrocarbon radical is made by a negative substituent such as chlorine. They are useful as solvents, freezing point depressants, and as intermediates in the production of synthetic resins. They may also be dehydrated to unsaturated alcohols and to dienes, or nitrated for use as Diesel fuel ignition promoters.

The following examples are given for the purpose of illustrating the invention:

Example 1

102 parts of 4-methyl meta-dioxane, 413 parts of 5.0% sulfuric acid, and 60 parts of propylene (all parts by weight) were placed into a copper-lined bomb capable of withstanding 2,000 pounds/sq. in. pressure and provided with a means for agitation. The bomb was heated to 90-95° C., was maintained at this temperature for 24 hours, and was vigorously agitated throughout this period. The bomb and its contents were cooled at the end of the reaction period, and the excess olefin, which could be recycled if desired, was bled off. The contents of the bomb was neutralized with sodium carbonate solution and filtered. Water and low boiling by-products were removed from the filtrate by distillation up to 100° C. in a fractionating column. The residue from this distillation was vacuum distilled under 2 mm. pressure; 38 parts of pure 1,3-butanediol (boiling point, 204° C. at 760 mm.) were obtained. This is equivalent to a 62% yield of dihydric alcohol based upon the quantity of meta-dioxane reacted. 32 parts of 4-methyl meta-dioxane were recovered.

Example 2

400 parts of 1% sulfuric acid and 120 parts of 4-methyl meta-dioxane were charged into a copperlined bomb. 60 parts of propylene were then distilled into the bomb. The mixture was agitated and heated to 150° C. for 24 hours. On cooling of the bomb, and removal of the excess propylene by distillation, the contents of the reactor consisted of 556 parts of reaction mixture.

The product was neutralized with potassium carbonate solution and filtered. The filtrate was distilled in a fractionating column at atmospheric pressure. The distillate, which was taken overhead at 69-100° C., was later shown to contain 44 parts of 4-methyl meta-dioxane. The residue was vacuum distilled, and yielded 136 parts of 1,3-butanediol, which boiled almost constantly at 204° C. (atmospheric pressure).

Example 3

400 parts of 1% sulfuric acid and 120 parts of 4,5-dimethyl meta-dioxane were placed in a copper lined bomb. The bomb was cooled and 87 parts of butene-2 were distilled in. The bomb was then heated and shaken for 14 hours at 145-150° C. At the end of this time the excess butene-2 was bled off (38 parts) and the contents of the bomb weighed 569 parts. The solution was neutralized, filtered and fractionated. Water, unreacted meta-dioxane, etc., were removed up to 100° C. The residue was vacuum distilled to yield 28 parts of 2-methyl 1,3 butanediol.

The above disclosure and examples are given for the purpose of illustration only and are not to be construed as in any way limiting the invention.

What is claimed is:

1. The hydrolysis of meta-dioxanes of the general formula

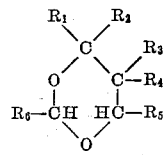

where $R_1$, $R_2$, $R_3$, $R_4$, $R_5$ and $R_6$ are chosen from the group consisting of alkyl, aryl, aralkyl, alkaryl and substituted alkyl, aryl, aralkyl and alkaryl radicals, in which the substitution in the hydrocarbon radical is made by a negative substituent, to corresponding diols of the general formula

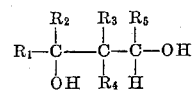

by treatment under pressure with dilute inorganic ternary acids in the presence of an excess of a compound selected from the group consisting of olefins and substituted olefins.

2. The step in the process of producing a 1,3-alkanediol from a meta-dioxane which consists in hydrolyzing the meta-dioxane in an atmosphere of olefin under pressure, and in the presence of an inorganic acid catalyst of not more than 5% concentration.

3. The step in the process of producing a 1,3-alkane-diol from a meta-dioxane which consists in hydrolyzing the meta-dioxane in an atmosphere of olefins, under pressure, and in the presence of a dilute inorganic ternary acid catalyst.

4. The process of hydrolyzing meta-dioxanes to obtain 1,3-alkanediols which comprises heating a mixture of at least equal volumes of meta-dioxane and a dilute inorganic aqueous acid-reacting substance of 0.05% to 5% concentration to a temperature of above 50° C. in the presence of sufficient olefin to gives a mol ratio of olefin to meta-dioxane greater than 1, and under the pressure generated by the reaction, removing the unreacted olefin, and recovering the 1,3-alkanediols.

5. The process of making 1,3-butanediol which consists in hydrolyzing 4-methyl meta-dioxane at 90-95° C., and at a pressure at least equal to the vapor pressure of the reaction mixture, with 5.0% sulfuric acid in an amount equal by volume to the quantity of diether used, and in the presence of greater than stoichiometrical proportions of propylene, for 24 hours, removing the unreacted propylene, neutralizing the reaction mixture, filtering, removing the water and other low-boiling constituents from the filtrate by distillation under reflux conditions, and then vacuum-distilling the residue from the first distillation step to recover the pure dihydric alcohol.

6. The process of making a 1,3-butanediol which consists in hydrolyzing 4-methyl meta-dioxane at 90-95° C., and at a pressure at least equal to the vapor pressure of the reaction mixture, with an inorganic ternary acid of 5% concentration in an amount equal by volume to the quantity of diether used and in the presence of greater than stoichiometrical proportions of propylene, for 24 hours, removing the unreacted propylene, neutralizing the reaction mixture, filtering and recovering the 1,3-butanediol.

LOUIS A. MIKESKA.